United States Patent
Locher et al.

(10) Patent No.: US 12,512,670 B2
(45) Date of Patent: Dec. 30, 2025

(54) DATA STRUCTURE COMPRISING AN ENERGY SCHEDULE AND METHOD FOR PROVIDING A DATA STRUCTURE COMPRISING AN ENERGY SCHEDULE

(71) Applicant: Hitachi Energy Ltd, Zürich (CH)

(72) Inventors: Thomas Locher, Zurich (CH); Yvonne-Anne Pignolet, Zurich (CH); Alexandre Oudalov, Fislisbach (CH)

(73) Assignee: HITACHI ENERGY LTD, Zürich (CH)

( * ) Notice: Subject to any disclaimer, the term of this patent is extended or adjusted under 35 U.S.C. 154(b) by 538 days.

(21) Appl. No.: 17/626,659

(22) PCT Filed: Jul. 10, 2020

(86) PCT No.: PCT/EP2020/069664
§ 371 (c)(1),
(2) Date: Jan. 12, 2022

(87) PCT Pub. No.: WO2021/009080
PCT Pub. Date: Jan. 21, 2021

(65) Prior Publication Data
US 2022/0263313 A1    Aug. 18, 2022

(30) Foreign Application Priority Data
Jul. 12, 2019   (EP) ..................... 19186145

(51) Int. Cl.
*H02J 3/00*   (2006.01)
*H02J 3/28*   (2006.01)
*H02J 3/46*   (2006.01)

(52) U.S. Cl.
CPC ............... *H02J 3/003* (2020.01); *H02J 3/28* (2013.01); *H02J 3/466* (2020.01)

(58) Field of Classification Search
CPC ...................................................... H02J 3/466
See application file for complete search history.

(56) References Cited

U.S. PATENT DOCUMENTS 11,960,346 B1 *  4/2024  Sproch ................. H02M 1/008
2005/0228553 A1 * 10/2005  Tryon ..................... B60L 50/16
                                                  701/22

(Continued)

FOREIGN PATENT DOCUMENTS

CN      109102120 A      12/2018
JP      2019-032659 A    2/2019

OTHER PUBLICATIONS

International Search Report and Written Opinion of the International Searching Authority for the related International Application No. PCT/EP2020/069664 dated Oct. 9, 2020, 9 pages.

*Primary Examiner* — Nathan L Laughlin
(74) *Attorney, Agent, or Firm* — Procopio, Cory, Hargreaves & Savitch LLP

(57) ABSTRACT

An aspect of the present disclosure relates to a method for providing a data structure comprising a refined energy schedule, the method comprising receiving a plurality of energy demand requests, energy storage offers, and/or energy supply offers from a plurality of participants of a power network; determining by a plurality of distributed computational units the refined energy schedule, using an optimization function, under consideration of the plurality of energy demand requests, energy storage offers, and/or energy supply offers, wherein the refined energy schedule is an at least substantially optimal energy schedule; and appending the refined energy schedule to the data structure. A further aspect of the disclosure relates to a data structure, in particular to the data structure provided in the method.

16 Claims, 2 Drawing Sheets

(56) References Cited

U.S. PATENT DOCUMENTS

| | | | |
|---|---|---|---|
| 2012/0290862 A1* | 11/2012 | Brown | H04L 41/0833 |
| | | | 713/320 |
| 2012/0316688 A1* | 12/2012 | Boardman | H02J 13/00026 |
| | | | 700/286 |
| 2014/0277797 A1 | 9/2014 | Mokhtari et al. | |
| 2015/0372485 A1* | 12/2015 | Borean | G01D 4/00 |
| | | | 700/275 |
| 2017/0358168 A1* | 12/2017 | Fan | G06Q 20/3829 |
| 2018/0165660 A1 | 6/2018 | High et al. | |

* cited by examiner

DATA STRUCTURE COMPRISING AN ENERGY SCHEDULE AND METHOD FOR PROVIDING A DATA STRUCTURE COMPRISING AN ENERGY SCHEDULE

CROSS-REFERENCE TO RELATED APPLICATIONS

The present application is a national stage entry of International Patent App. No. PCT/EP2020/069664, filed on Jul. 10, 2020, which claims priority to European App. No. 19186145.9, filed on Jul. 12, 2019, which are both hereby incorporated herein by reference as if set forth in full.

FIELD OF THE INVENTION

The present disclosure relates to the field of power networks, in particular to the field of control and/or management of power networks. In particular, the present disclosure relates to a method for providing a data structure comprising a refined energy schedule and a computer-implemented data structure comprising a refined energy schedule.

BACKGROUND OF THE INVENTION

In a power network, there is a plurality of participants comprising energy generating units, energy storage units, and/or demand units, in particular controllable demand units. These participants of the power network may transmit energy demand requests, energy storage offers, and/or energy supply offers for a subsequent time period, such as day-ahead, to a system operator. The system operator determines based on this information an energy schedule for the subsequent time periods that determines for example amounts of energy to be supplied to or used by the participants.

The underlying optimization problem can increase in complexity with the number of participants of the power network. In particular with the increase in number of producing energy units, such as distributed energy resources, participating in the power network, it becomes a more and more computationally complex task to derive an optimal energy schedule and an architecture of centralized computation of the energy schedule by the system operator may not be able to scale with the number of participants, resulting in suboptimal schedules.

US 2018/0165660 discloses a method and a system for managing a demand on an electrical grid; the herein disclosed method comprises receiving a request from an energy consumption device, using a portion of cryptocurrency

DESCRIPTION OF THE INVENTION

It is an objective of the present disclosure to provide a method for providing a data structure comprising a refined energy schedule; in this method, the refined energy schedule is calculated in a distributed manner by a plurality of distributed computational units, taking advantage of a plurality of distributed computational resources, which are for example outside the access of a system operator, in particular at sites of the plurality of participants of the power network. This way, also in case of an optimization function of high complexity and therefor insufficient computational resources available to the system operator, an at least substantially optimal energy schedule can be determined and provided in a data structure. It is a further objective of the present disclosure to provide a data structure that enables secure and efficient handling, for example storage and/or distribution, of the refined energy schedule in a distributed manner, in particular even in case not all or none of the plurality of computational units can be trusted.

These objectives are achieved by the subject-matter of the independent claims. Further exemplary embodiments are evident from the dependent claims and the following description.

A first aspect of the present disclosure relates to a, in particular computer-implemented, method for providing a, in particular computer-implemented, data structure comprising a refined energy schedule. The method comprises receiving a plurality of energy demand requests, energy storage offers, and/or energy supply offers from a plurality of participants of a power network, determining, by a plurality of distributed computational units, the refined energy schedule using an optimization function, under consideration of the plurality of energy demand requests, energy storage offers, and/or energy supply offers, wherein the refined energy schedule is an at least substantially optimal energy schedule, in particular with respect to the optimization function, and appending the refined energy schedule to the data structure. For receiving the plurality of energy demand requests, energy storage offers, and/or energy supply offers from the plurality of participants of the power network, the plurality of participants of the power network may transmit the plurality of energy demand requests, energy storage offers, and/or energy supply offers to a system operator that receives the plurality of energy demand requests, energy storage offers, and/or energy supply offers and distributes it to the plurality of distributed computational units; or the plurality of distributed computational units may receive the plurality of energy demand requests, energy storage offers, and/or energy supply offers and may then, in particular, distribute the plurality of energy demand requests, energy storage offers, and/or energy supply offers among each other. The data structure is provided to the plurality of participants of the power network. By way of example, this can be achieved by sending the data structure to the participants of the power network, in particular by a system operator, or, in particular in case of a distributed data structure, more in particular in case of a distributed ledger, even more in particular in case of a blockchain, the data structure may be made directly accessible to the plurality of participants of the power network, for example by the plurality of distributed computational units. The data structure is verified by the plurality of participants of the power network, in particular by verifying an authenticated confirmation message and/or a, in particular cryptographic, hash of at least a preceding refined energy schedule, in particular wherein the hash and/or the authenticated confirmation message are provided in the data structure, in particular in the second data block, and/or in particular wherein the data structure further comprises the first data block. In particular upon successful verification of the authenticated confirmation message and/or the hash, the plurality of participants of the power network supply, store, and/or consume energy according to the refined energy schedule.

A second aspect of the present disclosure relates to a computer-readable, in particular non-transitory, medium comprising instructions which, when executed by a computer, cause the computer to carry out the method according to the first aspect of the present disclosure.

A third aspect of the present disclosure relates to a computer-implemented data structure, in particular the data structure as provided in the method according to the first aspect of the present disclosure. The computer-implemented data structure comprises a refined energy schedule; herein, the refined energy schedule is determined by a plurality of distributed computational units using an optimization function and under consideration of a plurality of energy demand requests, energy storage offers, and/or energy supply offers from a plurality of participants of a power network, and the refined energy schedule is an at least substantially optimal energy schedule.

In the aspects of the present disclosure, the refined energy schedule may comprise, for a subsequent time period such as a subsequent day and/or for time intervals, for example of 5 min to 60 min, within the time period and for each of at least a subset of the plurality of participants of the power network a parameter of the group consisting of energy to be stored, energy to be produced, energy to be consumed, a power setpoint, dispatched energy, and unit commitment. The participants of the power network may comprise an energy generating unit, an energy storage unit, an energy market operator, and/or a demand unit, in particular a controllable demand unit. In embodiments, distributed computational units may comprise computational sub-units. In other embodiments, at least a subset, in particular each, of the plurality of distributed computational units may be located at sites of the plurality of participants of the power network, for example, acting as control unit for the participants of the power network. A system operator may be in particular one of the group consisting of an operator of a utility, an operator of a transmission system, an energy market operator such as wholesale and/or retail market operator, an operator of a distribution system, an operator of a distributed energy resources management system, and an operator of an advanced distribution management system, and may in particular comprise or is a control unit.

In embodiments, for determining the refined energy schedule by a plurality of distributed computational units, using an optimization function, under consideration of the plurality of energy demand requests, energy storage offers, and/or energy supply offers, a first computational method may be employed, the computational method may comprise at least one of the group consisting of an iterative algorithm, a heuristic algorithm, an algorithm relying on line searches and/or trust regions, a zero-order optimization algorithm, a first-order optimization algorithm, a second-order optimization algorithm, Newton's method, gradient descent, Frank-Wolfe method, a Quasi-Newton method, a subgradient method, an interior point method, sequential quadratic programming, conjugate gradient method, ellipsoid method, simultaneous perturbation stochastic approximation method, interpolation method, pattern search method, a memetic algorithm, differential evolution, an evolutionary algorithm, dynamic relaxation, a genetic algorithm, hill climbing, Nelder-Mead simplical heuristic, particle swarm optimization, cuckoo search, gravitational search, artificial bee colony optimization, simulated annealing, stochastic tunneling, table, reactive search optimization, simplex algorithm, combinatorial algorithms, quantum optimization algorithm, alpha-beta pruning, branch and bound, Bruss algorithm, chain matrix multiplication, constraint satisfaction, cross-entropy method, golden section search, harmony search, interior point method, machine learning. In the context of the present disclosure, an at least substantially optimal energy schedule may yield a return value of the optimization function corresponding to a global or local extremum of the optimization function or an approximation thereof. In this context, approximation may in particular mean a value within 80%, more in particular within 90%, even more in particular within 95% of the exact value. A skilled person knows to set up a computational method, in particular the first computational method, that enables determining the refined energy schedule using the optimization function, as long as sufficient energy resources are given. This disclosure concerns to a lesser extent the specifics of the computational method to determine the refined energy schedule, than it concerns providing computational resources to determine the refined energy schedule.

In embodiments, aspects of the present disclosure may be based on distributed ledger technology, in particular on blockchain technology. In embodiments, determining the refined energy schedule may comprise computing, by each of the plurality of distributed computational units, a respective energy schedule using the optimization function, under consideration of the plurality of energy demand requests, energy storage offers, and/or energy supply offers, and selecting, in particular based on a return value of the optimization function, the refined energy schedule from the respective energy schedules, in particular using a consensus mechanism, in particular among the plurality of distributed computational units. By way of example, the one of the respective energy schedules that yields the highest or lowest return value of the optimization function after a computing period may be selected as the refined energy schedule, or the firstly computed one of the respective energy schedules that yields a return value of the optimization function above or below a given threshold may be selected as the refined energy schedule. In other words, the respective energy schedules may represent a proof-of-work within a consensus mechanism among the plurality of distributed computational units. In embodiments, the one of the plurality of distributed computational units that computed the respective energy schedule selected as the refined energy schedule may append the refined energy schedule to the data structure. In embodiments, selecting the refined energy schedule from the respective energy schedules may comprise distributing at least a subset of the respective energy schedules among the plurality of distributed computational units and agreeing among the plurality of distributed computational units on the refined energy schedule. Herein, agreeing among the plurality of distributed computational units may be within the consensus mechanism among the plurality of distributed computational units wherein the respective energy schedules represent a proof-of-work.

In embodiments, determining the refined energy schedule may comprise dividing a computational task into a plurality of computational sub-tasks, assigning each of the plurality of computational sub-tasks to a respective one of the plurality of distributed computational units, and performing the each of the plurality of computational sub-tasks by the respective one of the of the plurality of distributed computational units. Herein, the computational task may underlie determining the refined energy schedule. To divide the computational task into the plurality of computational sub-tasks, a second computational method may be employed, the second computational method may comprise for example a divide-and-conquer algorithm. In embodiments, each of at least a subset of the plurality of the computational sub-tasks may relate only to a respective sub-network of the power network wherein the respective sub-network is determined based on a topology of the power network. In addition or as an alternative, the optimization function may be divided into a plurality of partial optimization functions, each of the plurality of partial optimization functions corresponding to a respective one of the of the plurality of computational sub-tasks. In embodiments, the respective one of the plurality of computational units may comprise a respective plurality of computational sub-units; and, within performing the each of the plurality of computational sub-tasks, each of the respective plurality of computational sub-units computes a solution to the each of the plurality of computational sub-tasks and an at least substantially optimal solution from the solutions computed by the respective plurality of computational sub-units is selected, for example as an output of the each of the plurality of computational sub-tasks. Selecting the least substantially optimal solution may in particular be based on a return value of the respective partial optimization function and/or may be within a consensus mechanism among the respective plurality of computational sub-units, the consensus mechanism in particular being based on distributed ledger and/or blockchain technology. By way of example, the at least substantially optimal solution that yields the highest or lowest return value of the respective partial optimization function after a computing period may be selected, or the firstly computed one of the solutions that yields a return value of the respective partial optimization function above or below a given threshold may be selected. In the context of the present disclosure, an at least substantially optimal solution may yield a return value of the respective partial optimization function corresponding to a global or local extremum of the partial optimization function or an approximation thereof. In this context, approximation may in particular mean a value within 80%, more in particular within 90%, even more in particular within 95% of the exact value. A skilled person knows to set up a computational method, in particular the second computational method, that enables dividing the computational task into the plurality of computational sub-tasks. This disclosure concerns to a lesser extent the specifics of the computational method to divide the computational task into the plurality of computational sub-tasks, than it concerns providing computational resources to solve each of the plurality of computational sub-tasks.

In embodiments, the, in particular computer-implemented, data structure is a distributed data structure, in particular implemented on the plurality of distributed computational units and/or based on distributed ledger technology, in particular based on blockchain technology. In other words, the, in particular computer-implemented, data structure can be a distributed ledger, in particular a blockchain. Herein, a blockchain may be an immutable distributed ledger, distributed onto the plurality of computational units.

In embodiments, the computer-implemented data structure comprises a first data block that comprises a preceding refined energy schedule, for example a refined energy schedule for a preceding time period. In embodiments, the method may comprise creating a second data block that comprises the refined energy schedule and a hash, in particular a cryptographic hash, of at least parts of the first data block. The at least parts of the first data block may comprise the preceding refined energy schedule, a header of the first data block, and/or an authenticated confirmation message.

In embodiments, a system operator may agree with or correct the refined energy schedule in the data structure. For example, the system operator may check the refined energy schedule, for example with respect to meeting constraints and/or with respect to a corresponding return value of the optimization function. To correct the refined energy schedule, the system operator may replace the refined energy schedule in the data structure with another of the respective energy schedules or may compute a new refined energy schedule using computational resources available to the system operator and then replace the refined energy schedule in the data structure with the new refined energy schedule.

In embodiments, the system operator may create an authenticated confirmation message and append the authenticated confirmation message to the data structure, in particular to a data block in the data structure, the data block comprising the refined energy schedule and in particular being the second data block. With this, the system operator may confirm agreeing with the refined energy schedule and/or having corrected the refined energy schedule.

In embodiments, the method may further comprise determining a computational effort of each of at least a subset of the plurality of distributed computational units for determining the refined energy schedule, and in particular using the computational effort as a basis for remuneration. Herein, the at least a subset of the plurality of distributed computational units may be or comprise the one of the plurality of distributed computational units that computed the respective energy schedule selected as the refined energy schedule.

In embodiments, an objective of the optimization function comprises at least one of the group consisting of maximum utilization of certain energy generation types such as a renewable energy, reduction of $CO_2$ emission, stabilization of grid operation, cost minimization. The optimization function may comprise a constraint relating to an aspect of the power network, such as loading of grid components, nodal voltages, availability of reserves, and/or system inertia, short circuit capacity, and/or a constraint relating to an aspect of the plurality of participants of the power network, such as ramp rate, start time, and/or stop time.

These and other aspects of the present disclosure will be apparent from and elucidated with reference to the embodiments described hereinafter.

BRIEF DESCRIPTION OF THE DRAWINGS

The subject-matter of the present disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Embodiments will be described in more detail with reference to the drawings, in which exemplary embodiments are shown.

Figure 1:
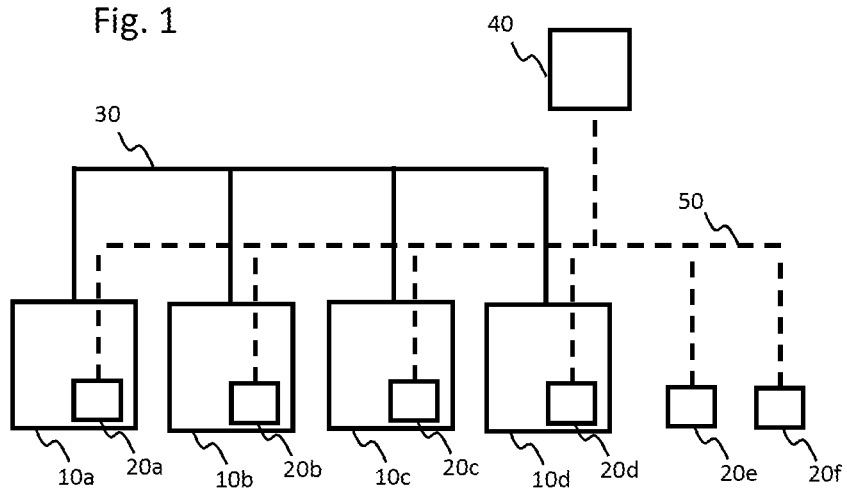
FIG. 1 schematically depicts an exemplary system to which aspects of the present disclosure can be applied.

FIG. 1 schematically depicts an exemplary system to which aspects of the present disclosure can be applied. This system comprises a power network 30 with participants 10*a*, 10*b*, 10*c*, 10*d*. These participants of the power network 10*a*, 10*b*, 10*c*, 10*d* may comprise energy generating units, energy market operators, energy storage units, and/or demand units, in particular controllable demand units. Energy generating units may e.g. comprise distributed energy resources such as photovoltaic power plants, wind energy farms, diesel generators. Energy storage units may e.g. comprise battery energy storage, electro thermal energy storage, and/or mechanical energy storage such as flywheels. Energy market operators may represent, serve, and/or act on behalf of a number of further participants of the power network. The system further comprises distributed computational units 20a, 20b, 20c, 20d, 20e, and 20f; a subset 20a, 20b, 20c, 20d of the plurality of distributed computational units is located at sites of the plurality of participants of the power network 10a, 10b, 10c, 10d and may act as control unit for at least at subset of the plurality of participants of the power network 10a, 10b, 10c, 10d. The system may further comprise a communication network 50 such as a wide area network. The distributed computational units 20a, 20b, 20c, 20d, 20e, and 20f may be communicatively coupled to the communication network. In addition, there may be a system operator 40 that in embodiments is also communicatively coupled to the communication network 50.

Figure 2:
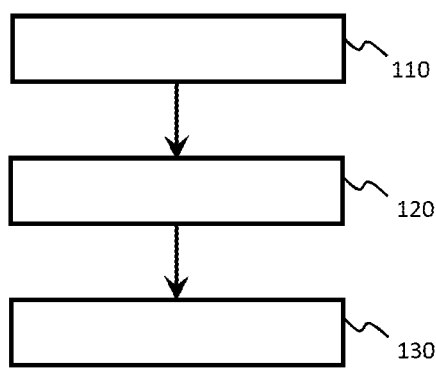
FIG. 2 schematically depicts an exemplary embodiment of the first aspect of the present disclosure.

FIG. 2 schematically depict an exemplary embodiment of the first aspect of the present disclosure by means of a flow diagram. Herein, method element 110 comprises receiving the plurality of energy demand requests, energy storage offers, and/or energy supply offers from the plurality of participants of the power network. Method element 120 comprises determining by a plurality of distributed computational units 20a, 20b, 20c, 20d, 20e, 20f the refined energy schedule 210, using an optimization function, under consideration of the plurality of energy demand requests, energy storage offers, and/or energy supply offers, wherein the refined energy schedule 210 is an at least substantially optimal energy schedule. Method element 130 comprises appending the refined energy schedule 210 to the data structure 200.

Figure 3:
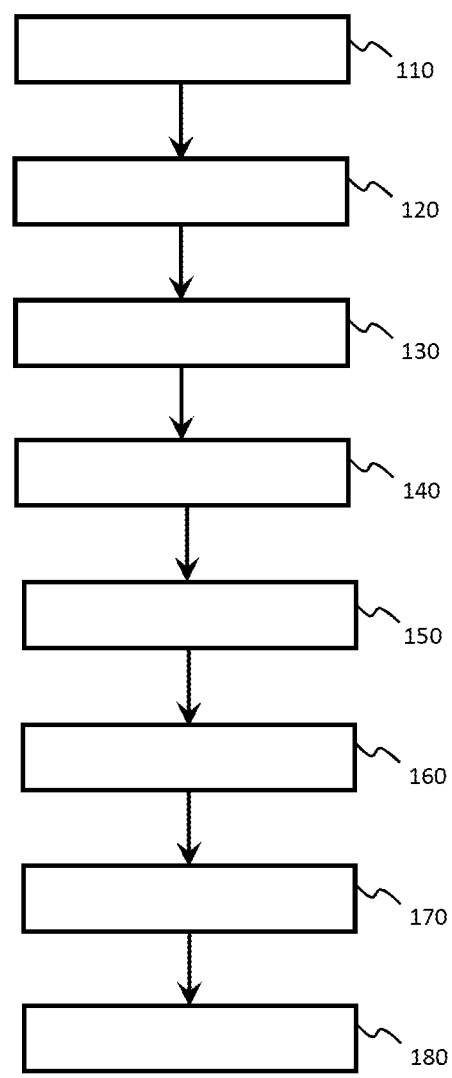
FIG. 3 schematically depicts an exemplary embodiment of the first aspect of the present disclosure.

FIG. 3 schematically depict a further exemplary embodiment of the first aspect of the present disclosure by means of a flow diagram. In addition to method elements 110, 120, and 130, this embodiment comprises further method elements 140, 150, 160, 170, and 180. Method element 140 comprises agreeing with or correcting the refined energy schedule 210 in the data structure 200 by a system operator 40. Method element 150 comprises creating an authenticated confirmation message 260a by the system operator 40 and appending the authenticated confirmation message 260a to the data structure 200. Method element 160 comprises providing the data structure 200 to the plurality of participants of the power network 10a, 10b, 10c, 10d. Method element 170 comprises verifying by the plurality of participants of the power network 10a, 10b, 10c, 10d the data structure 200. Method element 180 comprises supplying, storing, and/or consuming energy by the plurality of participants of the power network 10a, 10b, 10c, 10d according to the refined energy schedule 210.

Figure 4:
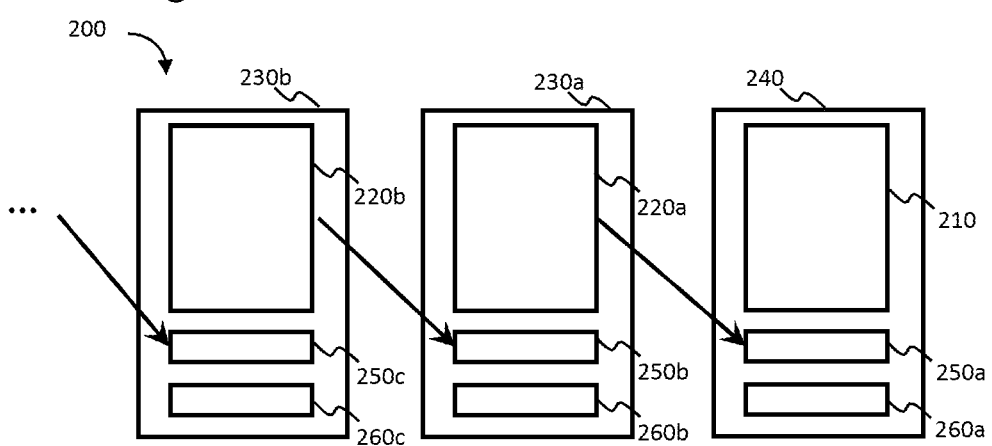
FIG. 4 schematically depicts an exemplary embodiment of the second aspect of the present disclosure.

FIG. 4 schematically depicts an exemplary embodiment of a data structure 200 according to the second aspect of the present disclosure. The data structure 200 may in particular be a blockchain and may comprise a second data block 240. The second data block 240 comprises the refined energy schedule 210, an authenticated confirmation message 260a, and a cryptographic hash 250a of the preceding refined energy schedule 220a in a first data block 230a. The second data block 240 may further comprise a header. The data structure 200 may further comprise the first data blocks 230a, 230b. The first data block 230a may comprise a cryptographic hash 250b to a preceding refined energy schedule 220b in the first data block 230b and the first data block 230b may itself comprise a cryptographic hash 250c to a preceding refined energy schedule in a further first data block. This way, a blockchain is created. The first data blocks 230a, 230b may further comprise authenticated confirmation messages 260b and 260c, respectively.

In the context of the present disclosure, a computational unit may be any kind of computational device comprising a processor, a memory, and a storage.

While embodiments have been described in detail in the drawings and foregoing description, such description is to be considered illustrative or exemplary and not restrictive. Variations to the disclosed embodiments can be understood and effected by those skilled in the art and practising the claimed embodiments, from a study of the drawings, the disclosure, and the appended claims. The word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF REFERENCE SYMBOLS 10a, 10b, 10c, 10d participant of power network
20a, 20b, 20c, 20d, 20e, 20f computational unit, plurality of computational units
30 power network
40 system operator
50 communication network, wide area network
200 data structure, computer-implemented data structure
210 refined energy schedule
220 preceding refined energy schedule
230 first data block
240 second data block
250a, 250b, 250c, 250d hash, cryptographic hash
260a, 260b, 260c, 260d authenticated confirmation message

The invention claimed is:

1. A method for providing a data structure comprising a refined energy schedule, the method comprising:
receiving a plurality of energy demand requests, energy storage offers, and/or energy supply offers from a plurality of participants of a power network;
determining by a plurality of distributed computational units, the refined energy schedule, using an optimization function, under consideration of the plurality of energy demand requests, energy storage offers, and/or energy supply offers, wherein determining the refined energy schedule comprises
computing, by each of the plurality of distributed computational units, a respective energy schedule, using the optimization function, under consideration of the plurality of energy demand requests, energy storage offers, and/or energy supply offers, and
selecting the refined energy schedule from the respective energy schedules, in particular based on a return value of the optimization function, wherein selecting the refined energy schedule from the respective energy schedules comprises
distributing at least a subset of the respective energy schedules among the plurality of distributed computational units, and
agreeing among the plurality of distributed computational units on the refined energy schedule;

generating a data block comprising the refined energy schedule;

appending the data block to a distributed ledger that is accessible to the plurality of participants of the power network;

verifying by the plurality of participants of the power network an authenticity of the data block appended to the distributed ledger; and supplying, storing, and/or consuming energy by the plurality of participants of the power network according to the refined energy schedule.

2. The method of claim 1, wherein at least a subset of the plurality of distributed computational units is located at sites of the plurality of participants of the power network.

3. The method of claim 1, wherein determining the refined energy schedule comprises:

dividing a computational task into a plurality of computational sub-tasks;

assigning each of the plurality of computational sub-tasks to a respective one of the of the plurality of distributed computational units; and performing the each of the plurality of computational sub-tasks by the respective one of the plurality of distributed computational units.

4. The method of claim 3, wherein the respective one of the plurality of computational units comprises a respective plurality of computational sub-units and wherein performing the each of the plurality of computational sub-tasks comprises computing, by each of the respective plurality of computational sub-units, a solution to the each of the plurality of computational sub-tasks, and selecting one solution from the solutions computed by the respective plurality of computational sub-units.

5. The method of claim 1, wherein the distributed ledger is a blockchain.

6. The method of claim 1, wherein, prior to appending the data block to the distributed ledger, the distributed ledger comprises a preceding data block that comprises a preceding refined energy schedule.

7. The method of claim 6, wherein the data block that is appended to the distributed ledger further comprises a hash of at least parts of the preceding data block.

8. The method of claim 1, further comprising agreeing with or correcting the refined energy schedule in the data structure by a system operator.

9. The method of claim 1, wherein the data block further comprises an authenticated confirmation message by the system operator.

10. The method of claim 1, further comprising determining a computational effort for determining the refined energy schedule of each of at least subset of the plurality of distributed computational units.

11. A non-transitory computer-readable medium comprising instructions which, when executed by a computer, cause the computer to carry out the method of claim 1.

12. A non-transitory computer-readable medium having a computer-implemented distributed ledger stored thereon, the distributed ledger comprising a plurality of data blocks, each of the plurality of data blocks comprising:

a refined energy schedule, wherein the refined energy schedule is determined by a plurality of distributed computational units, using an optimization function and under consideration of a plurality of energy demand requests, energy storage offers, and/or energy supply offers from a plurality of participants of a power network, wherein determining the refined energy schedule comprises computing, by each of the plurality of distributed computational units, a respective energy schedule, using the optimization function, under consideration of the plurality of energy demand requests, energy storage offers, and/or energy supply offers, and selecting the refined energy schedule from the respective energy schedules, in particular based on a return value of the optimization function, wherein selecting the refined energy schedule from the respective energy schedules comprises distributing at least a subset of the respective energy schedules among the plurality of distributed computational units, and agreeing among the plurality of distributed computational units on the refined energy schedule.

13. The method of claim 7, wherein verifying the authenticity of the data block comprises verifying the hash.

14. The method of claim 9, wherein verifying the authenticity of the data block comprises verifying the authenticated confirmation message.

15. A method comprising, by a system operator communicatively coupled to a communication network, for each time period of a plurality of time periods, in advance of the time period:

receiving participant data comprising a plurality of energy demand requests, energy storage offers, and/or energy supply offers, for the time period, from a plurality of participants of a power network that are communicatively coupled to the communication network;

distributing the participant data to a plurality of distributed computational units over the communication network, wherein each of the plurality of distributed computational units determines a respective energy schedule based on the participant data using an optimization function;

determining a refined energy schedule based on the respective energy schedules determined by the plurality of distributed computational units, wherein determining the refined energy schedule based on the respective energy schedules comprises distributing at least a subset of the respective energy schedules among the plurality of distributed computational units, and agreeing among the plurality of distributed computational units on the refined energy schedule;

generating a data block that comprises the refined energy schedule and a hash of at least a part of a preceding data block in a distributed ledger that is accessible to the plurality of participants; and appending the data block to the distributed ledger.

16. The method of claim 15, further comprising, by each of the plurality of participants, for each time period of the plurality of time periods:

verifying an authenticity of the data block that was appended to the distributed ledger for that time period; and during that time period, supplying, storing, and/or consuming energy according to the refined energy schedule in that data block.

* * * * *